Inventor
John L. Rupp
By John E. Stryker Jr.
Attorney

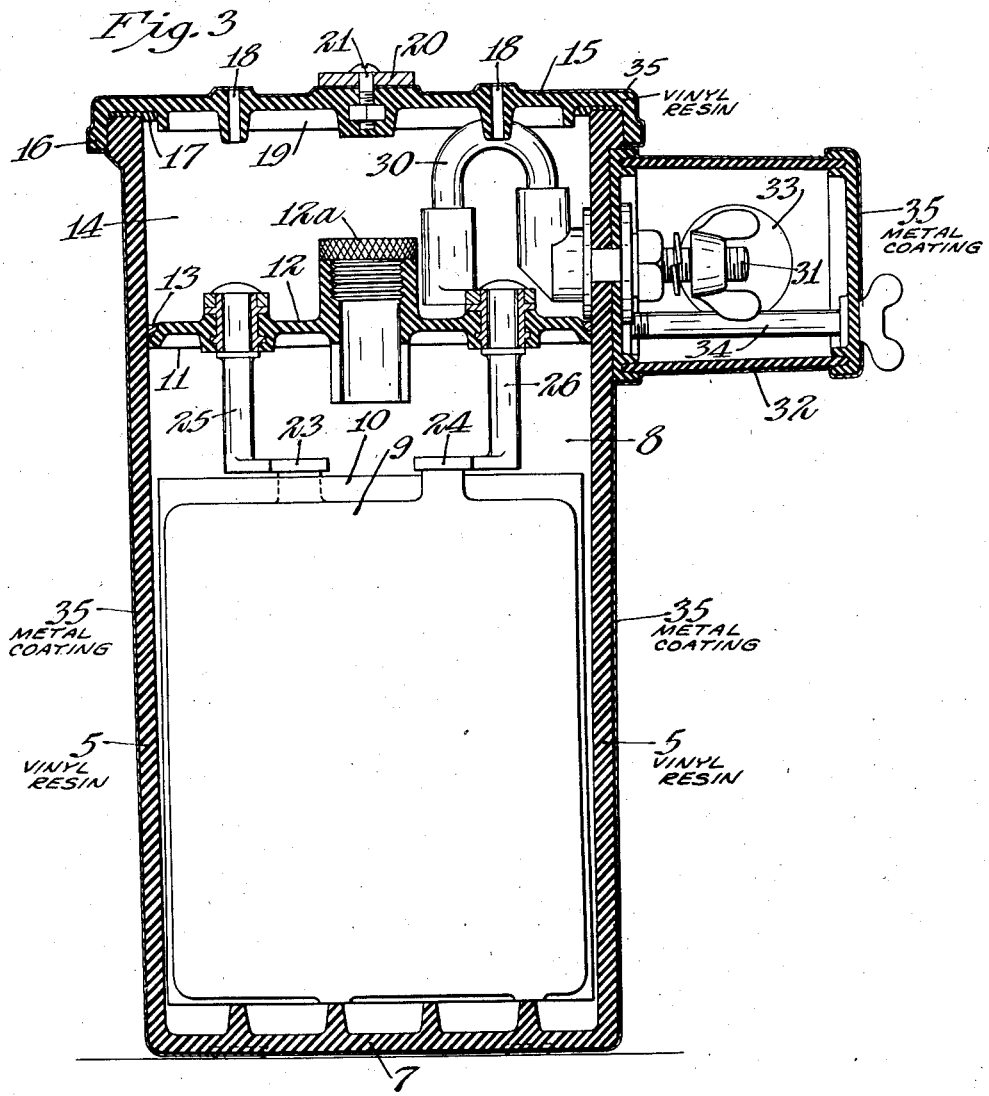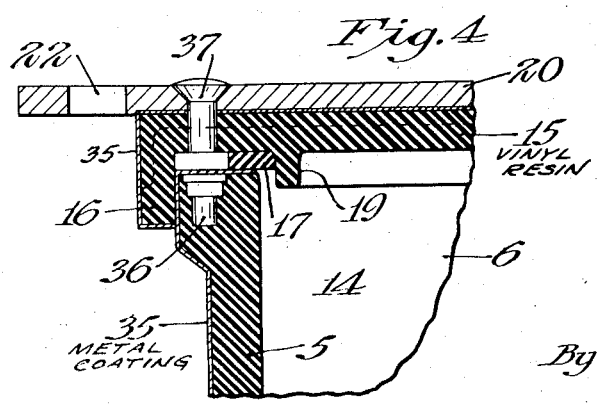

Patented June 26, 1945

2,379,189

UNITED STATES PATENT OFFICE 2,379,189

STORAGE BATTERY FOR AIRCRAFT

John L. Rupp, Williamsville, N. Y., assignor to National Battery Company, St. Paul, Minn., a corporation of Delaware Application January 23, 1942, Serial No. 427,954

3 Claims. (Cl. 136—170)

This invention relates particularly although not exclusively to storage batteries for use in aircraft. Such batteries must, in addition to furnishing a source of electrical energy, be so constructed as to prevent spillage of electrolyte when inverted, they must be shielded to prevent radio interference and the weight of the parts must be reduced to a minimum consistent with the strength required.

By the present invention I fulfill these requirements, simplify the construction and reduce the cost of manufacture. The weight of my improved container is reduced by eliminating the usual heavy metal shields as well as the acid-resistant lining which has heretofore been necessary to protect the shield from the electrolyte and I also furnish ample protection against radio interference by providing a metallic filament which completely covers the outer surfaces of a strong, self-sustaining container and overhead compartment molded from a plastic material which is inert in respect to the electrolyte and conditions prevailing in the battery.

Referring to the accompanying drawings:

Fig. 3 shows the battery in vertical cross section, the outer and cell cover sections being taken respectively at the center planes through these parts, and Fig. 4 is an enlarged fragmentary section taken on the line 4—4 of Fig. 1.

Figure 1:
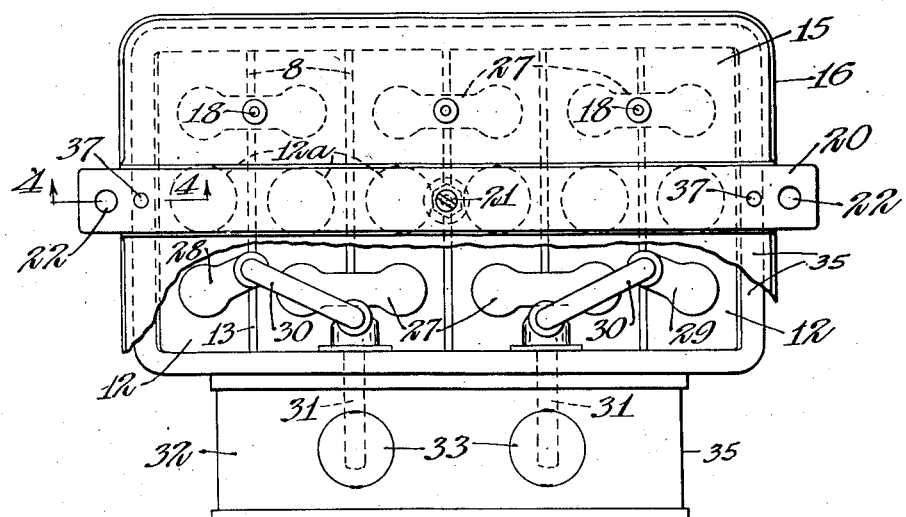
Figure 1 is a plan view of my improved battery with a portion of the outer cover broken away.
Figure 2:
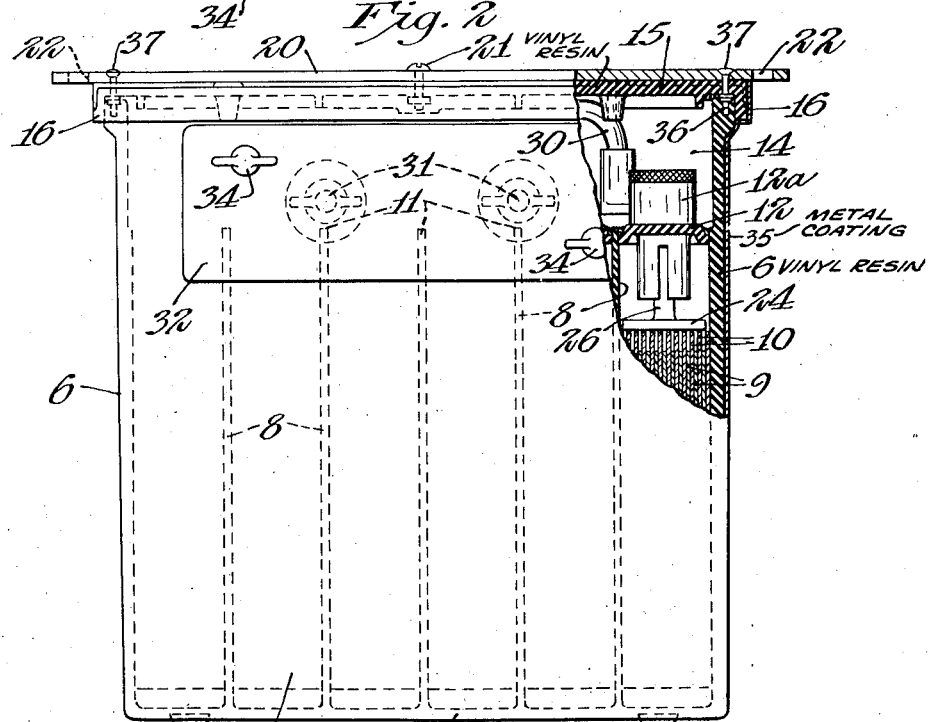
Fig. 2 is a part side elevation and part vertical section of the same.

My improved battery container comprises side walls 5, end walls 6, a bottom 7 and cell partitions 8 formed integral with each other by molding a strong, self-sustaining plastic which is inert under the conditions prevailing in the battery. A series of vertical partitions 8 divide the container into six cells and each cell contains groups of positive and negative plates 9 and separators 10 all immersed in a liquid electrolyte in conventional manner. The upper edges 11 of the partitions 8 are disposed in a common horizontal plane located a substantial distance below the upper edges of the container walls. The top of each cell is preferably closed by a cell cover 12 which is sealed at its edges and securely bonded to the adjoining container walls and partitions by suitable adhesive 13. Each cell cover 12 has a removable filling and vent plug 12a of the usual or suitable construction.

It will be understood that the vent plugs in general use are not always effective to prevent spillage of electrolyte when the battery is inverted or tilted substantially, as is frequently necessary when used in military and naval aircraft. To receive the electrolyte which is spilled from the several cells of the battery, I provide the compartment 14 extending above the several cells. The top of the container is closed by an outer cover 15 preferably formed with pendant flanges 16 fitting outside of the container walls. A gasket 17 of soft rubber or other suitable material is provided between the cover and upper edges of the container walls to seal the joint. Vent passages 18 extend through the cover to the compartment 14 and have extensions which project down from the cover to trap the electrolyte in this compartment. Reinforcing ribs 19 are also formed on the bottom surface of the cover. To hold the cover in place, a rigid metal bar 20 is extended across its top surface and longitudinally thereof and is fastened to the cover centrally by a bolt 21. The ends of the bar 20 have perforations 22 to receive hold-down bolts.

In each cell the battery has straps 23 and 24 connecting the plate lugs of the positive and negative groups respectively and cell posts 25 and 26 are rigidly joined to the straps and extend up through perforations in the cell cover for intercell connections. Intercell connecting bars 27 extend from cell to cell in the usual or suitable manner and the terminal posts 28 and 29 of the end cells are provided with U-shaped connectors 30 and binding posts 31. The latter extend horizontally through perforations in one of the side walls 5 into a terminal housing 32 projecting from the exterior of the wall and provided with knockout disks 33 for the battery circuit cables. The housing 32 is formed in three parts held together by a pair of wing bolts 34, the inner ends of which engage the wall 5 of the main battery container.

A plastic having the characteristics of polystyrene or methyl-methacrylate is preferably used in a hydraulic press to form not only the main container but the cell covers 12, outer cover 15 and terminal housing 32. Such plastic has adequate strength combined with resistance to the acid electrolyte ordinarily used in batteries and the electrolytic action which takes place therein.

The entire outer surfaces of the container walls 5 and 6, bottom 7, cover 15 and housing 32 are covered by a filament 35 of metal adapted to shield the battery and prevent interference with radio communication. This shield may be applied by spraying or painting on a comminuted metal in a suitable vehicle or by electro-plating directly on the plastic or by applying thereto an adhesive and metal foil. To insure a good bond between the filament and plastic, the surfaces of the latter may be cleaned and slightly roughened by sand blasting. A filament of a few thousandths to a few hundredths of an inch in thickness is sufficient to perform the shielding function and does not materially increase the weight of the battery container. The use of the lighter metals, such as aluminum or magnesium, is preferred as the shield but several of the heavier metals, for example, copper, cadmium, silver or lead may be substituted therefor.

An electric connection between the portions of the metal filament on the container walls and that on the cover 15 is formed by a pair of metal inserts 36 imbedded in the upper edges of the container end walls and a pair of rivets 37 extending through the cover 15 in registry with the inserts 36. The rivets 37 pass through the hold-down bar 20 and perform the further function of connecting it to the cover 15.

From the foregoing specification it will be understood that by constructing my improved container from a plastic of the class described, I reduce the weight and provide adequate strength. I also simplify the construction by eliminating the usual heavy metal shell and protective lining therefor while affording the overhead compartment for spillage and the thin metal shield securely bonded to the exterior surfaces of the entire structure.

Having described my invention, what I claim as new and desire to protect by Letters Patent is:

1. For an aircraft storage battery, a molded light weight container comprising a strong, self-sustaining vinyl resin which is inert under the conditions prevailing in the battery, forming four integral walls, a bottom, cell partitions and an outer removable cover, each cell containing plates, separators and an electrolyte, means for closing the top of the cells substantially below the top of the container, the upper portion of the container providing an overhead compartment for electrolyte spillage, a vent passage formed in said cover and projecting from the bottom interior surface thereof to trap liquid electrolyte in said compartment when the battery is inverted, means interposed between said outer cover and container walls for sealing the joint against the escape of electrolyte from said compartment and a continuous metallic filament of thickness not exceeding a few hundredths of an inch completely covering and adhering to the outer surfaces of said walls, bottom and outer cover.

2. For an aircraft storage battery, a light weight molded container comprising a strong, self-sustaining vinyl resin which is inert under the conditions prevailing in the battery, forming four integral walls, a bottom, cell partitions and an outer removable cover, each cell containing plates, separators and an acid electrolyte, means for closing the top of the cells substantially below the top of the container, the upper portion of the container providing an overhead compartment for electrolyte spillage, a vent passage formed in said cover to place said compartment in communication with the atmosphere exterior to the container, means interposed between said cover and container walls for sealing the joint against the escape of liquid electrolyte from said compartment, a continuous metallic filament completely covering and adhering to the outer surfaces of said walls, bottom and outer cover and extending between said cover and the adjoining surface of the container walls, a rigid metal bar adapted to be secured by hold down means to a support on the aircraft, said bar extending upon the outer surface of said outer cover and in contact with the filament thereon to confine said cover in sealing relation to the walls of the container and an electric conductor extending through the outer cover and connecting the filament thereon with that on said adjoining surface of the container walls.

3. For an aircraft battery, a molded light weight container comprising a strong, self-sustaining vinyl resin forming four integral walls, a bottom, cell partitions and an outer removable cover, each cell containing plates, separators and an electrolyte, means for closing the top of the cells substantially below the top of the container, the upper portion of the container providing an overhead compartment for electrolyte spillage, a vent passage formed in said cover and projecting down from the bottom interior surface thereof to trap liquid electrolyte in said compartment when the battery is inverted, means interposed between said outer cover and container walls for sealing the joint against the escape of liquid electrolyte from said compartment, the outer surfaces of said walls, bottom and outer cover being roughened and a continuous metallic filament of thickness not exceeding a few hundredths of an inch completely covering and adhering to said roughened outer surfaces of the walls, bottom and outer cover.

JOHN L. RUPP.